March 18, 1969 R. H. BELLMAN ET AL 3,433,408
BINARY COUNTER
Filed Nov. 15, 1967
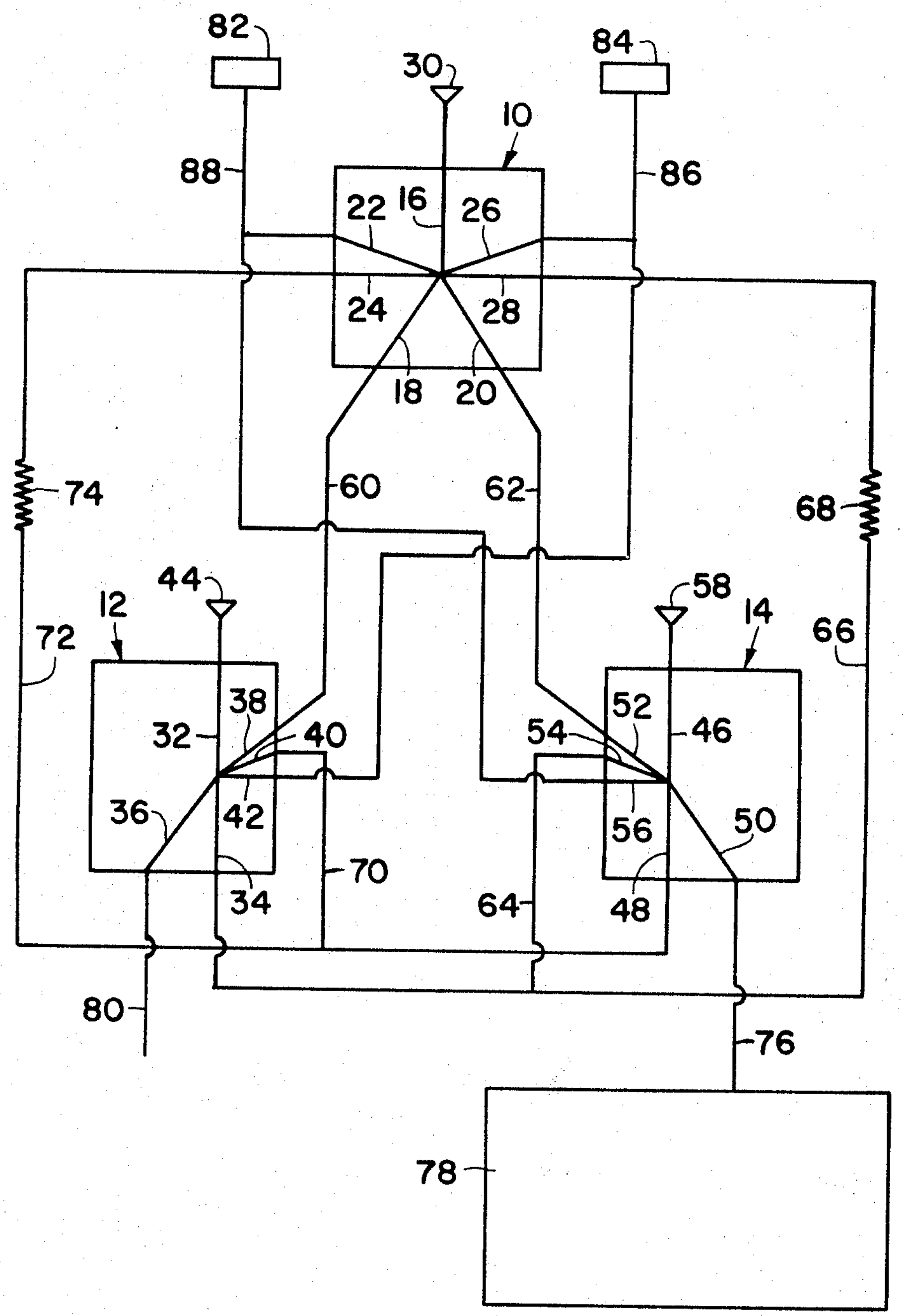
INVENTORS.
Robert H. Bellman
Thomas W. Bermel
BY Walter S. Zebrowski
ATTORNEY 3,433,408
Patented Mar. 18, 1969

3,433,408

BINARY COUNTER

Robert H. Bellman, Horseheads, and Thomas W. Bermel, Corning, N.Y., assignors to Corning Glass Works, Corning, N.Y., a corporation of New York Filed Nov. 15, 1967, Ser. No. 683,368
U.S. Cl. 235—201 7 Claims
Int. Cl. G06d 1/00

ABSTRACT OF THE DISCLOSURE

A high recovery rate binary counter having high pressure sensitivity and independence to output loading. The counter embodies a bistable fluid amplifier and two NOR gates with one outlet of the fluid amplifier being connected to a control nozzle of one of the NOR gates and the other outlet being connected to a control nozzle of the other NOR gate. The NOR outlet of said one NOR gate is connected to another control nozzle of the other NOR gate and to the opposing control nozzle of the fluid amplifier through a restricted bypass passage. The NOR outlet of said other NOR gate is connected to another control nozzle of said one NOR gate and to the other control nozzle of the fluid amplifier through a second restricted bypass passage.

*Background of the invention*

Although fluidic binary counters have been known, such as those wherein a pair of bistable fluid amplifiers are cascaded, such prior art counters did not have sufficient pressure sensitivity, were not independent of output loading, required well defined input pulses, and the like. As is readily seen, such counters provided many disadvantage in practical applications.

A bistable "lock-on" type fluid amplifier is one where the fluid power stream or input pulse locks on to one wall or the other of an interaction chamber and the power stream is directed substantially entirely to one or the other of a pair of outlet passages in response to fluid signals applied to the control nozzles thereof.

A NOR gate is a fluidic device wherein an inlet or power stream is directed substantially entirely to one of two outlet passages. The device has a plurality of control nozzles disposed such that a fluid signal applied to any one of them will cause the power stream to be deflected to the other outlet passage. The outlet passage through which the stream ordinarily passes when no fluid is applied to a control nozzle is called the NOR outlet, while the outlet to which the power stream is deflected by the fluid signal passing through one or more of the control nozzles is called the OR outlet.

*Summary of the invention*

The objects of the present invention are to provide a simple, direct, rugged and inexpensive fluidic binary counter having high pressure sensitivity, does not require well defined input pulses, is independent of outlet loading, and one which overcomes the hereinabove noted disadvantages.

Briefly, according to the present invention, a high recovery rate binary counter is provided comprising a bistable fluid amplifier and two NOR gates. One outlet of the fluid amplifier is connected to a control nozzle of one of the NOR gates and the other outlet is connected to the control nozzle of the other NOR gate. The NOR outlet of one of the NOR gates is connected to another control nozzle of the other NOR gate and to the opposing control nozzle of the fluid amplifier through a restricted bypass passage. The NOR outlet of the other NOR gate is connected to another control nozzle of the first NOR gate and to the other control nozzle of the fluid amplifier through a second bypass passage.

Additional objects, features, and advantages of the present invention will become apparent to those skilled in the art from the following detailed description and the attached drawing on which, by way of example, only the preferred embodiment of this invention is illustrated.

*Brief description of the drawing*

The only figure is a schematic diagram of the binary counter of the present invention.

*Detailed description*

By the term fluid as used herein is meant any compressible fluid such as air, nitrogen, or other gases or incompressible fluid such as water or the like, which fluids may contain solid particles. This invention is not limited to any particular fluid.

The drawing illustrates the fluid operated binary counter of the present invention which includes a bistable fluid amplifier 10 and a pair of NOR gates 12 and 14. Fluid amplifier 10 comprises a power stream or inlet nozzle 16, a pair of outlet passages 18 and 20, and four control nozzles 22, 24, 26, and 28. Inlet nozzle 16 is connected to a suitable source 30 of fluid signals. NOR gate 12 has an inlet nozzle 32, a NOR outlet passage 34, an OR outlet passage 36, and a plurality of control nozzles 38, 40, and 42. Inlet nozzle 32 is connected to a suitable source 44 of fluid. Similarily, NOR gate 14 has an inlet nozzle 46, a NOR outlet 48, an OR outlet 50, and a plurality of control nozzles 52, 54, and 56. Inlet nozzle 46 is connected to a suitable source 58 of fluid.

Outlet passage 18 of fluid amplifier 10 is connected to control nozzle 38 of NOR gate 12 by means of passage 60, and outlet passage 20 is connected to control nozzle 52 of NOR gate 14 by means of passage 62. NOR outlet 34 of NOR gate 12 is connected to control nozzle 54 of NOR gate 14 by means of passage 64 and is also connected to opposing control nozzle 28 of fluid amplifier 10 by means of bypass passage 66 embodying fluid resistor 68. Similarily, NOR outlet 48 of NOR gate 14 is connected to control nozzle 40 of NOR gate 12 by means of passage 70 and is also connected to opposing control nozzle 24 of fluid amplifier 10 by means of bypass passage 72 embodying fluid resistor 74. Fluid resistors 68 and 74 may be restrictions in bypass passages 66 and 72 respectively, or may be orifices, porous plugs, or the like.

OR outlet passage 50 of NOR gate 14 is connected by means of passage 76 to a suitable utilization device 78 such as a binary counter indicator means. Such an indicator means may be a spring loaded flag device which counts and indicates the number of fluid pulses received. OR outlet passage 80 is ordinarily connected to the next counter stage, not shown. The fluid flow in passage 80 would serve as the input to such next stage.

The operation of the binary counter of the present invention is as follows. A power stream provided by source 44 is emitted through inlet nozzle 32 of NOR gate 12. For the purposes of this description it is assumed that initially, this power stream will pass through NOR outlet 34 which will be applied to the control nozzle 54 of NOR gate 14 and also to opposing control nozzle 28 of fluid amplifier 10 through bypass passage 66 and resistor 68. Simultaneously, a fluid stream from source 58 is emitted through inlet nozzle 46 of NOR gate 14. This fluid will pass through OR outlet 50 and passage 76 to utilization device 78 as a result of the fact that the fluid emitted from control nozzle 54 will cause the power stream to be deflected to outlet passage 50. The fluid pulses to be counted are received from source 30 and are transmitted through power stream nozzle 16 to either outlet passage 18 or 20 of fluid amplifier 10. For the purposes of this description it is assumed that the first pulse will be transmitted through outlet passage 18. The signal passing through outlet passage 18, and subsequently through control nozzle 38, will cause the power stream emitted from inlet nozzle 32 to be deflected to OR outlet passage 36 and passage 80 to become the input to the next counter stage, not shown, or may be applied to the utilization device as readily understood in the art. Simultaneously, the fluid passed through NOR outlet passage 34 and applied to the control nozzles 28 and 54 will cease whereupon the power stream emitted by inlet nozzle 46 of NOR gate 14 will flop over and return to NOR passage 48 from OR passage 50. This fluid will then be passed through control nozzle 40 of NOR gate 12 and opposing control nozzle 24 of fluid amplifier 10.

Since the fluid stream emitted through inlet nozzle 46 of NOR gate 14 is a continuous stream, a continuous flow of fluid will be emitted through control nozzle 40 of NOR gate 12 causing the power stream emitted from inlet nozzle 32 to remain directed through OR outlet 36 until another pulse is supplied to inlet nozzle 16 of fluid amlifier 10 from source 30.

As a second signal is passed through inlet nozzle 16 it will be caused to flow through outlet passage 20 of fluid amplifier 10 due to the fluid emitted from control nozzle 24, which fluid is supplied by NOR outlet 48 of NOR gate 14 through bypass passage 72 and resistor 74. This second signal will then be passed through control nozzle 52 of NOR gate 14 and will cause the power stream emitted from inlet nozzle 46 to be flopped over or deflected from NOR outlet passage 48 to OR outlet passage 50 and thereafter through passage 76 to utilization device 78. This will cause the heretofore described sequence to take place in reverse. Namely, the fluid passing through control nozzles 24 and 40 will cease and the power stream emitted from inlet nozzle 32 will return to NOR outlet passage 34 from OR outlet 36 whereupon this fluid will be directed through opposing control nozzle 28 and also through control nozzle 54 continuously deflecting the power stream emitted from inlet nozzle 46 to OR outlet 50. With a fluid flow passing through opposing control nozzle 28 the next impulse passed through inlet nozzle 16 will then be directed through outlet passage 18 of fluid amplifier 10 and the process will be repeated.

As is seen, each pulse passed through inlet nozzle 16 of fluid amplifier 10 will cause the power streams emitted from inlet nozzle 32 and 46 to be alternately passed through passages 76 and 80 to the utilization device or to the next counter stage as heretofore described, whereupon the mechanics of binary counting can be effected.

Referring again to the drawing, it is seen that a pair of signal sources 82 and 84 are provided for setting and resetting the binary counter of the present invention. For the purposes of the present description, it is assumed that "zero" is represented when the fluid stream passes through passage 80 and "one" is represented when the fluid stream passes through passage 76 to utilization device 78. When it is desired to reset the counter to "zero" a fluid signal is provided from source 84 through passage 86 to control nozzle 26 of fluid amplifier 10 and control nozzle 42 of NOR gate 12. This will cause the power stream emitted from inlet nozzle 32 of NOR gate 12 to pass through OR outlet 36 whereupon the power stream emitted from inlet nozzle 46 of NOR gate 14 will pass through NOR outlet passage 48 as heretofore described. On the other hand, when it is desired to preset the binary counter, a fluid set signal is provided from source 82 through passage 88. This signal is applied to control nozzle 22 of fluid amplifier 10 and control nozzle 56 of NOR gate 14. This procedure will cause the power stream emitted from inlet nozzle 46 to be directed through OR outlet passage 50 of NOR gate 14. While the power stream emitted from inlet passage 32 of NOR gate 12 will be directed through NOR outlet passage 34 causing the power stream of NOR gate 14 to continue passing through outlet passage 50 as heretofore described.

Fluid resistors 68 and 74 are selected to permit a passage of fluid flow therethrough sufficient to direct the succeeding pulse issue through inlet nozzle 16 to the opposing outlet passage but insufficient to switch or deflect a continuing flow from inlet nozzle 16. For example, if the fluid pulse issuing from inlet nozzle 16 is passing through outlet passage 20, fluid passing through bypass passage 66 through control nozzle 28 will be insufficient to switch such signal from outlet passage 20 to outlet passage 18, however, once such signal terminates and the succeeding one is issued through inlet nozzle 16 the flow through control nozzle 28 will be sufficient to direct the signal to outlet passage 18.

One familiar with the art will readily understand that the final design parameters of specific fluid devices will at least be dependent upon the fluid density, temperature, and pressure as well as the characteristics of the outlet streams at the point of utilization.

We claim:

1. A fluid operated binary counter comprising a bistable fluid amplifier having an inlet nozzle, a pair of outlet passages, and a plurality of control nozzles, a first fluid operated NOR gate having an inlet nozzle, a NOR outlet passage, an OR outlet passage, and a plurality of control nozzles, one of the outlet passages of said bistable fluid amplifier being connected to one of the control nozzles of said first fluid operated NOR gate, a second fluid operated NOR gate having an inlet nozzle, a NOR outlet passage, an OR outlet passage, and a plurality of control nozzles, the other of the outlet passages of said bistable fluid amplifier being connected to one of the control nozzles of said second fluid operated NOR gate, first and second fluid resistors, and first and second feedback passages, (i) the NOR outlet passage of said second NOR gate being connected to the opposing control of said bistable fluid amplifier through said first feedback passage and said first resistor, and also being connected to another of the control nozzles of said first NOR gate, (ii) the NOR outlet passage of said first NOR gate being connected to the opposing control nozzle of said bistable fluid amplifier through said second feedback passage and said second resistor, and also being connected to another of the control nozzles of said second NOR gate.

2. The fluid operated binary counter of claim 1 further comprising a utilization device.

3. The fluid binary counter of claim 1 further comprising a means for resetting the counter.

4. The fluid operated binary counter of claim 3 wherein said means for resetting comprise a source of fluid pulses connected to a control nozzle of said first fluid operated NOR gate and to an opposing control nozzle of said bistable fluid amplifier.

5. The fluid operated binary counter of claim 1 further comprising a means for setting said counter.

6. The fluid operated binary counter of claim 5 wherein said setting means comprise a source of fluid signals connected to a control nozzle of said second fluid operated NOR gate and also to an opposing control nozzle of said bistable fluid amplifier.

7. The fluid operated binary counter of claim 1 wherein said resistors are restrictions within the bypass passages.

References Cited

UNITED STATES PATENTS

| | | | |
|---|---|---|---|
| 3,227,368 | 1/1966 | Jacoby | 235—201 |
| 3,342,197 | 9/1967 | Phillips | 235—201 |

RICHARD B. WILKINSON, *Primary Examiner.*

LAWRENCE R. FRANKLIN, *Assistant Examiner.*

UNITED STATES PATENT OFFICE

CERTIFICATE OF CORRECTION

Patent No. 3,433,408

March 18, 1969

Robert H. Bellman et al.

It is certified that error appears in the above identified patent and that said Letters Patent are hereby corrected as shown below:

Column 4, line 25, "issue" should read -- issued --; line 62, after "control" insert -- nozzle --.

Signed and sealed this 31st day of March 1970.

(SEAL)
Attest:

Edward M. Fletcher, Jr.
Attesting Officer

WILLIAM E. SCHUYLER, JR.
Commissioner of Patents